(12) United States Patent
Archie et al.

(10) Patent No.: US 8,467,993 B2
(45) Date of Patent: Jun. 18, 2013

(54) MEASUREMENT TOOL MONITORING USING FLEET MEASUREMENT PRECISION AND TOOL MATCHING PRECISION ANALYSIS

(75) Inventors: Charles Archie, Hopewell Junction, NY (US); Andrew Brendler, Hopewell Junction, NY (US); Dmitriy Shneyder, Hopewell Junction, NY (US); Eric Solecky, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 12/687,145

(22) Filed: Jan. 14, 2010

(65) Prior Publication Data

US 2011/0172958 A1    Jul. 14, 2011

(51) Int. Cl.
*G06F 17/18*    (2006.01)
*G06F 19/00*    (2011.01)

(52) U.S. Cl.
USPC ............ 702/179; 702/182; 702/183; 702/184

(58) Field of Classification Search
USPC ................................ 702/179–189, 1, 85, 127
See application file for complete search history.

(56) References Cited

U.S. PATENT DOCUMENTS

| 7,213,478 B2 | 5/2007 | Harada et al. |
| 7,315,851 B2 | 1/2008 | Cheng et al. |
| 7,467,063 B2 | 12/2008 | Archie et al. |
| 2006/0195294 A1* | 8/2006 | Archie et al. ................. 702/179 |

OTHER PUBLICATIONS

Solecky et al., "Monitoring Measurement Tools: New Methods for Driving Continuous Improvements in Fleet Measurement Uncertainty", Feb. 23, 2009, SPIE Digital Library, vol. 7272, pp. 1-22.*
Solecky et al., "New Comprehensive Metrics and Methodology for Metrology Tool Fleet Matching", 2005, SPIE Digital Library, vol. 5752, pp. 248-258.*
Solecky, et al., Monitoring Measurement Tools: New Methods for Driving Continuous Improvements in Fleet Measurement Uncertainty, Metrology, Inspection, and Process Control for Microlithography XXIII, 2009, SPIE.

* cited by examiner

*Primary Examiner* — Phuong Huynh
(74) *Attorney, Agent, or Firm* — Cantor Colburn LLP; Ian MacKinnon (57) ABSTRACT

A method for monitoring a fleet comprising a plurality of measurement tools includes collecting data for a current time interval from the fleet by a data collection module; and performing fleet measurement precision (FMP)/tool matching precision (TMP) analysis on the collected data by a FMP/TMP analysis module, wherein FMP/TMP analysis comprises determining a TMP for each of the plurality of measurement tools using a static and a dynamic benchmark measuring system (BMS); and determining a FMP for the fleet using the static and the dynamic BMS; and determining if the FMP is above a predetermined threshold by a fleet improvement module, and in the event the FMP is above the predetermined threshold, identifying at least one tool of the plurality of tools as poorly performing based on the TMPs; and flagging the identified at least one tool for improvement.

20 Claims, 4 Drawing Sheets

MEASUREMENT TOOL MONITORING USING FLEET MEASUREMENT PRECISION AND TOOL MATCHING PRECISION ANALYSIS

FIELD

This disclosure relates generally to the field of measurement tool monitoring.

DESCRIPTION OF RELATED ART

Measurement tools are used in a variety of industries in which precise and accurate measurements are required, such as integrated circuit manufacturing. Challenges relative to attaining quality measurements are presented in terms of individual measurement tools and across a fleet of measurement tools. To enable effective process monitoring and control, tools that measure a fabrication process are required to meet certain measurement uncertainty specifications, which may be generally described as comprising of matching and precision components. For the most demanding processes, such specifications may be very tight and difficult to achieve, especially over the entire expected lifespan of a tool fleet. Acceptable performance may be demonstrated during one or more evaluation periods for one or more tools in the fleet. However, over time and across the rest of the fleet, a process may have measurement uncertainty concerns that prevent optimal process control, thereby limiting product yield. There is a need to continually improve the measurement uncertainty of a fleet until the fleet can no longer meet the tolerance requirements, at which point the fleet may be replaced or upgraded using new technology.

Statistical process control (SPC) monitoring techniques focus on maintaining the performance of the fleet by comparison of data gathered from a single tool in a current time period to a control chart that is derived from a prior stable evaluation time period. SPC monitoring uses the control charts to compare recent fluctuations of a process variable with control limits that reflect its natural performance. Measurement data is collected, averages are extracted from the collected fleet data, and control charts are generated from the averages. Control chart limits are statistically calculated based on the mean, standard deviation, or range of data collected from the fleet during a known in-control period. Points which fall outside of the control limits or which exhibit statistically unusual patterns may be flagged for investigation for an assignable cause. Variable (or continuous) parameters are typically monitored using two control charts: an X-bar (mean) chart and either an S-chart (standard deviation) or an R-chart (range). A tool in the fleet may be prevented from measuring finished product when a statistical deviation by the tool is detected by SPC monitoring.

The SPC control charts are primarily concerned with periodic fluctuations, and do not support evaluation of overall fleet measurement uncertainty. The SPC approach is reactive, determining if a given tool, on a given day, can run product based on SPC limits determined by either historical data or measurement requirements. SPC may deem a tool to be in-control and predictable, while the tool is not actually capable of satisfying requirements when one considers the fleet as a whole. It is possible for the individual tool SPC charts to suggest the fleet is healthy, while overall measurement uncertainty is in fact poor.

The assessment and purchase of new tools may be aligned with significant business or technical milestones; however, introduction of new processes and products may occur more frequently than tools are replaced or upgraded. The resulting mismatch may be reconciled by tightening the performance of the existing toolset. Techniques such as improving calibrations, increasing the frequency of adjustments, and changing sampling plans may be employed to tighten the toolset measurement variation. Such efforts redefine what is meant by in-control. A common practice is to replace SPC control limits with the tighter specifications, and then react to the inevitable increase in out-of-control situations, but this carries the risk of flagging natural variation as being out-of-control and hunting for assignable causes that do not exist.

A complicating factor is that measurement tools of different generations or types may be used to measure the same process. Systematic differences between the various measurement tools may not be captured when they are monitored independently with separate control charts. For the reasons mentioned above, SPC control charts alone may not provide enough information to ensure that a fleet of measurement tools is performing as required over time. In particular, gaps between the fleet's overall measurement uncertainty, as expressed by statistically calculated control limits and tool requirements, must be addressed. The fleet of measurement tools may be in control with respect to a calibration of a previous technology generation, but the requirements may be ever tightening, necessitating continuous improvement in the fleet. There is a need to determine when the limits of a toolset have been reached. If the toolset cannot be improved as needed because of inherent limitations, then a new generation with better capabilities is required. Tactical workarounds are possible, such as measurement tool dedication or management of systematic differences between tools via a lookup table, but these workarounds may not be desirable in a manufacturing setting.

BRIEF SUMMARY

In one aspect, a method for monitoring a fleet comprising a plurality of measurement tools includes collecting data for a current time interval from the fleet by a data collection module; and performing fleet measurement precision (FMP)/tool matching precision (TMP) analysis on the collected data by a FMP/TMP analysis module, wherein FMP/TMP analysis comprises determining a first TMP for each of the plurality of measurement tools using a dynamic benchmark measuring system (BMS), and determining a first FMP for the fleet using the dynamic BMS; and determining a second TMP for each of the plurality of measurement tools using a static BMS, and determining a second FMP for the fleet using the static BMS; and determining if the first FMP or the second FMP is above a predetermined threshold by a fleet improvement module, and in the event the first FMP or the second FMP is above the predetermined threshold, identifying at least one tool of the plurality of tools as poorly performing based on the first and second TMPs; and flagging the identified at least one tool for improvement.

In one aspect, a fleet monitoring system for monitoring a fleet comprising a plurality of measurement tools includes a data collection module configured to collect data regarding the fleet; a fleet measurement precision (FMP)/tool matching precision (TMP) analysis module configured to perform FMP/TMP analysis on the collected data, wherein FMP/TMP analysis comprises determining a first TMP for each of the plurality of measurement tools using a dynamic benchmark measuring system (BMS), and determining a first FMP for the fleet using the dynamic BMS; determining a second TMP for each of the plurality of measurement tools using a static BMS, and determining a second FMP for the fleet using the static BMS; a fleet improvement module configured to determine if the first FMP and the second FMP is above a predetermined threshold, and in the event the first FMP and the second FMP is above the predetermined threshold, identify at least one tool of the plurality of tools as poorly performing based on the first and second TMPs, and flag the identified at least one tool for improvement.

In one aspect, a computer program product comprising a computer readable storage medium containing computer code that, when executed by a computer, implements a method for monitoring a fleet comprising a plurality of measurement tools, wherein the method includes collecting data for a current time interval from the fleet; and performing fleet measurement precision (FMP)/tool matching precision (TMP) analysis on the collected data, wherein FMP/TMP analysis comprises determining a first TMP for each of the plurality of measurement tools using a dynamic benchmark measuring system (BMS), and determining a first FMP for the fleet using the dynamic BMS; determining a second TMP for each of the plurality of measurement tools using a static BMS, and determining a second FMP for the fleet using the static BMS; determining if the first FMP and the second FMP is above a predetermined threshold, and in the event the first FMP and the second FMP is above the predetermined threshold, identifying at least one tool of the plurality of tools as poorly performing based on the first and second TMPs; and flagging the identified at least one tool for improvement.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of systems and methods for measurement tool fleet monitoring using fleet measurement precision (FMP)/tool matching precision (TMP) analysis are provided, with exemplary embodiments being discussed below in detail.

Monitoring data collected from a measurement tool fleet may be used to implement FMP/TMP analysis, using both static and dynamic benchmark measurement system (BMS) metrics, to gauge, maintain, and improve a measurement system's stability. Identification of the specific tools in a fleet, and the characteristics of the identified tools, that contribute to matching measurement uncertainty allows for targeted improvement of fleet matching measurement uncertainty.

Data used to perform FMP/TMP analysis may be collected in the same manner as SPC data, or may be the same data in some embodiment. SPC and FMP/TMP analysis may be used in parallel to fully characterize collected monitoring data, allowing assessment of the measurement performance of the tool fleet, and identification of opportunities to drive improvements in the fleet.

Figure 1:
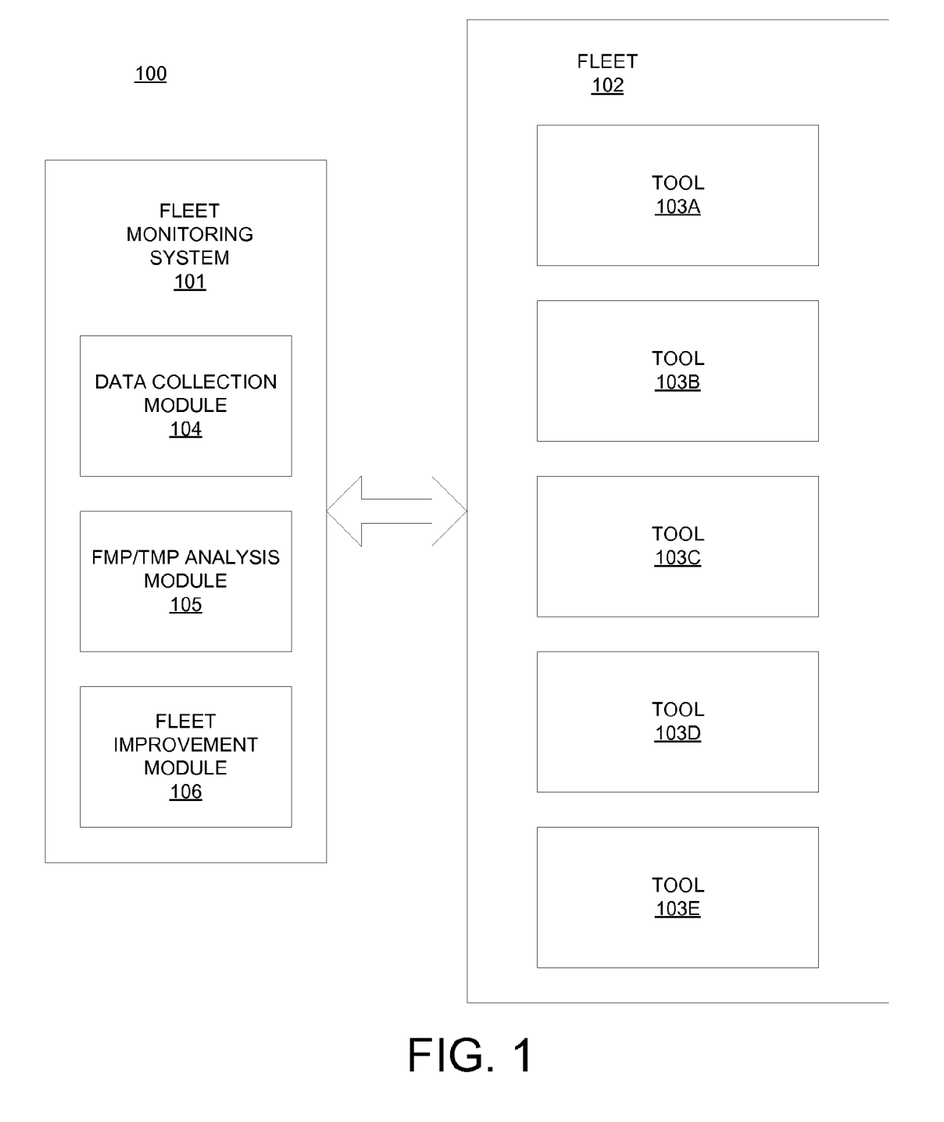
FIG. 1 illustrates an embodiment of a measurement tool fleet comprising a fleet monitoring system.

FIG. 1 illustrates an embodiment of a system 100 comprising a measurement tool fleet 102 and fleet monitoring system 101. Fleet 102 comprises a plurality of tools 103A-E. Tools 103A-E are shown for illustrative purposes only; a fleet 102 may comprise any appropriate number of tools. Fleet 102 is monitored by fleet monitoring system 101, which collects data regarding each of tools 103A-E and analyzes the collected data using FMP/TMP analysis. Tools 103A-E may be part of a semiconductor or integrated circuit manufacturing process, and may comprise any non-measurement-structure-altering metrology tools, including but not limited to scatterometry, overlay, atomic force microscopy (AFM), or thin film tools. Tools 103A-E may be different generations of technology, or from the same generation. Fleet monitoring system 101 comprises data collection module 104, FMP/TMP analysis module 105, and fleet improvement module 106.

Figure 2:
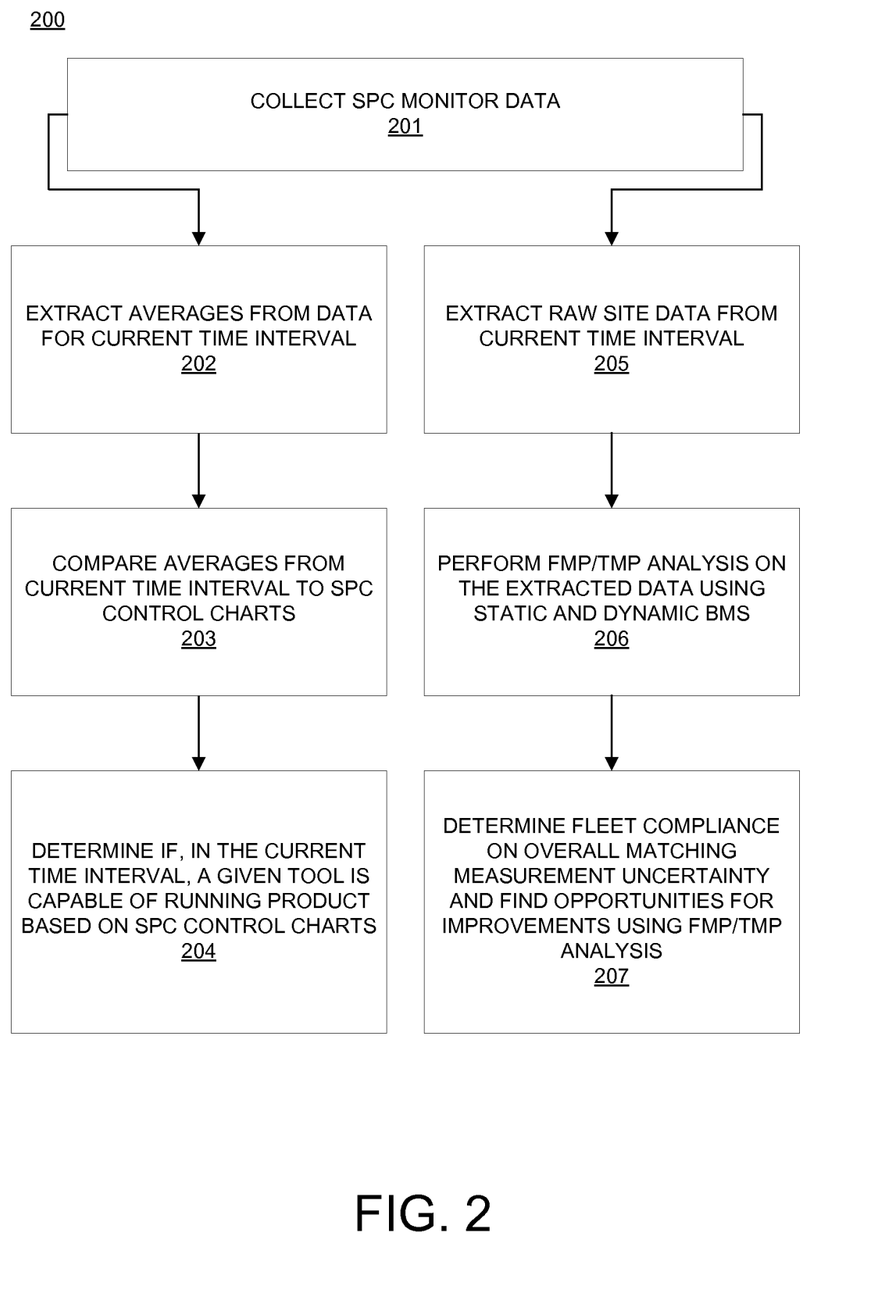
FIG. 2 illustrates an embodiment of a method for measurement tool monitoring using parallel SPC and fleet measurement precision/tool matching precision analysis.

FIG. 2 illustrates an embodiment of a method 200 for parallel SPC and FMP/TMP analysis. Method 200 is implemented in fleet monitoring system 101 of FIG. 1. In block 201, SPC monitor data for the fleet 102 is collected by data collection module 104. The collected data may be collected into a database. In some embodiments, one or more monitor wafers produced by the manufacturing process may be selected and measured by the one or more of tools 103A-E in the fleet to generate the SPC data. SPC data may be generated at a certain frequency for any or all tools in the fleet; the frequency may be any desired time interval, such as weekly or bi-weekly. In block 202, averages are extracted for the current interval. In block 203, the averages for the current interval are compared to SPC control chart limits. In block 204, it is determined if a given tool is capable of running product based on comparison to the SPC control chart limits. In block 205, raw site level data is extracted for the current time period. In block 206, FMP/TMP analysis is performed on the extracted data using static and dynamic BMS metrics by FMP/TMP analysis module 105; this is discussed in further detail below with regard to blocks 302A-B of FIG. 3. In block 207, compliance with overall matching measurement uncertainty is determined based on comparison of the calculated FMP with a predetermined threshold, and opportunities for fleet improvement are identified using FMP/TMP by fleet improvement module 106. This is discussed in further detail below with regard to blocks 303-306 in FIG. 3. Blocks 202-204 and blocks 205-207 may be performed in parallel using a single set of SPC data collected in block 201 by monitoring system 101.

Figure 3:
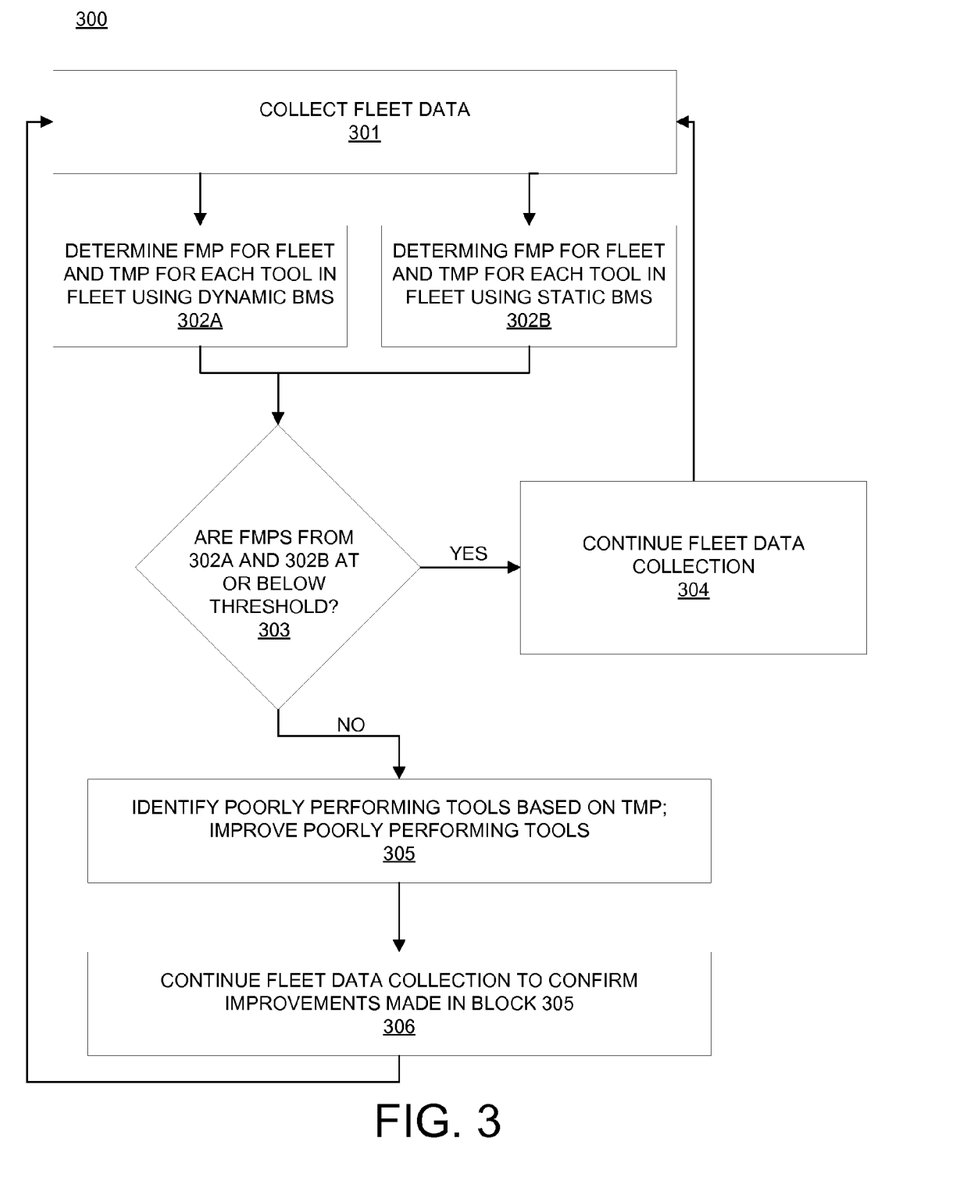
FIG. 3 illustrates an embodiment of a method for measurement tool monitoring using fleet measurement precision/tool matching precision analysis.

FIG. 3 illustrates an embodiment of a method 300 for measurement tool fleet monitoring using FMP/TMP analysis. Method 300 is implemented in fleet monitoring system 101 of FIG. 1. In block 301, the data collection module 104 of fleet monitoring system 101 collects data regarding fleet 102. Fleet data may be collected using SPC collection techniques. The collected fleet data may include any appropriate variable in the manufacturing process, including but not limited to a measurement of one or more monitor wafers by one or more tools in the fleet. Fleet data may be generated at a certain frequency; the frequency may be any desired time interval, such as weekly or bi-weekly.

In blocks 302A-B, the TMP for each of tools 103A-E is determined based on the collected fleet data, and the FMP for fleet 102 is also determined based on the collected fleet data by FMP/TMP analysis module 105. TMP and FMP are calculated as described in U.S. Pat. No. 7,467,063, issued Dec. 16, 2008, to Archie, et al., which is herein incorporated by reference in its entirety. TMP is a measure of each tool's contribution to FMP, and comprises 4 components: precision, offset, slope-induced shift offset (SISoffset), and linearity. TMP and FMP may be assessed periodically, for example, weekly or bi-weekly. If a particular tool is off-line for any given time interval, then only the remaining tools are available to run product for that time interval and the FMP determined for the time interval represents the matching measurement uncertainty of only the tools available to run product.

In order to calculate FMP and TMP, a BMS metric for the fleet is determined; BMS may be dynamic or static. Both dynamic and static BMS represent a fleet average. FMP and TMP are calculated using dynamic BMS in block 302A. Dynamic BMS is a fleet average for the current time interval. Dynamic BMS may change over time, and is therefore not sensitive to the original performance of the toolset. Dynamic BMS may be memoryless, and gauge real-time fleet uncertainty. FMP and TMP are separately calculated using static BMS in block 302B. Static BMS represents a fixed fleet average, and is calculated using data from a past fixed timeframe wherein all tools used to calculate the static BMS were known to be stable. Static BMS may give a picture of how the tools drift over time with respect to the fixed fleet average. The static BMS holds a constant reference over time, and therefore may show changes from the fleet's original performance state.

The entire fleet or any subset of tools in the fleet may be used to calculate static or dynamic BMS. Selecting all the tools provides to calculate BMS an unbiased assessment of the tool matching for a given time interval. However, if the fleet 102 is composed of more than one generation of a supplier's tools or tools from multiple suppliers, only the newest tools may be used to calculate the BMS, to highlight deficiencies in older tools. Optimum use of resources may dictate use of a best performing tool as a golden tool for BMS calculation, and marshalling resources for other tools only when their respective TMP indicators exceed control limits.

In block 303, it is determined whether either or both of the FMP metrics calculated in blocks 302A-B are at or below a predetermined threshold by fleet improvement module 106. If both FMPs from 302A-B are at or below the threshold, flow proceeds to block 304, in which data regarding fleet 102 continues to be collected, and flow loops back to block 301.

In block 305, if either or both FMPs from 302A-B are determined to be above the predetermined threshold, individual tools having measurement problems that contribute to the above-threshold FMP are identified based on the TMPs calculated using the static BMS and the dynamic BMS from block 302A-B by fleet improvement module 106. An identified tool may be a tool having relatively high TMP values compared to the rest of the fleet, or a tool having a TMP above a predetermined threshold. Particular TMP parameters contributing to a poorly performing tool's relatively high TMP, such as poor offset, precision, SISoffset, or linearity scores for the tool may also be identified, as is described in Archie, et al. An identified poorly performing tool may be flagged for improvement by the fleet monitoring system, and dealt with in any appropriate manner to improve the tool's TMP, taking into account the particularly significant parameters of the tool that contribute most to its relatively high TMP, thereby allowing targeted improvement of the overall FMP. One (or more) of the TMP parameters may also be identified as being relatively high across a plurality of tools; in this case, a common relatively high TMP parameter may be identified and flagged for improvement across the plurality of tools.

In block 306, fleet data collection continues, confirming improvements in the fleet from any changes made in block 305. Historical monitor data may be broken up into subsets of time that may be analyzed using the TMP and FMP metrics in order to compare with the TMP and FMP metrics from the current interval to confirm improvements over the historical data. Flow then loops back to block 301.

Figure 4:
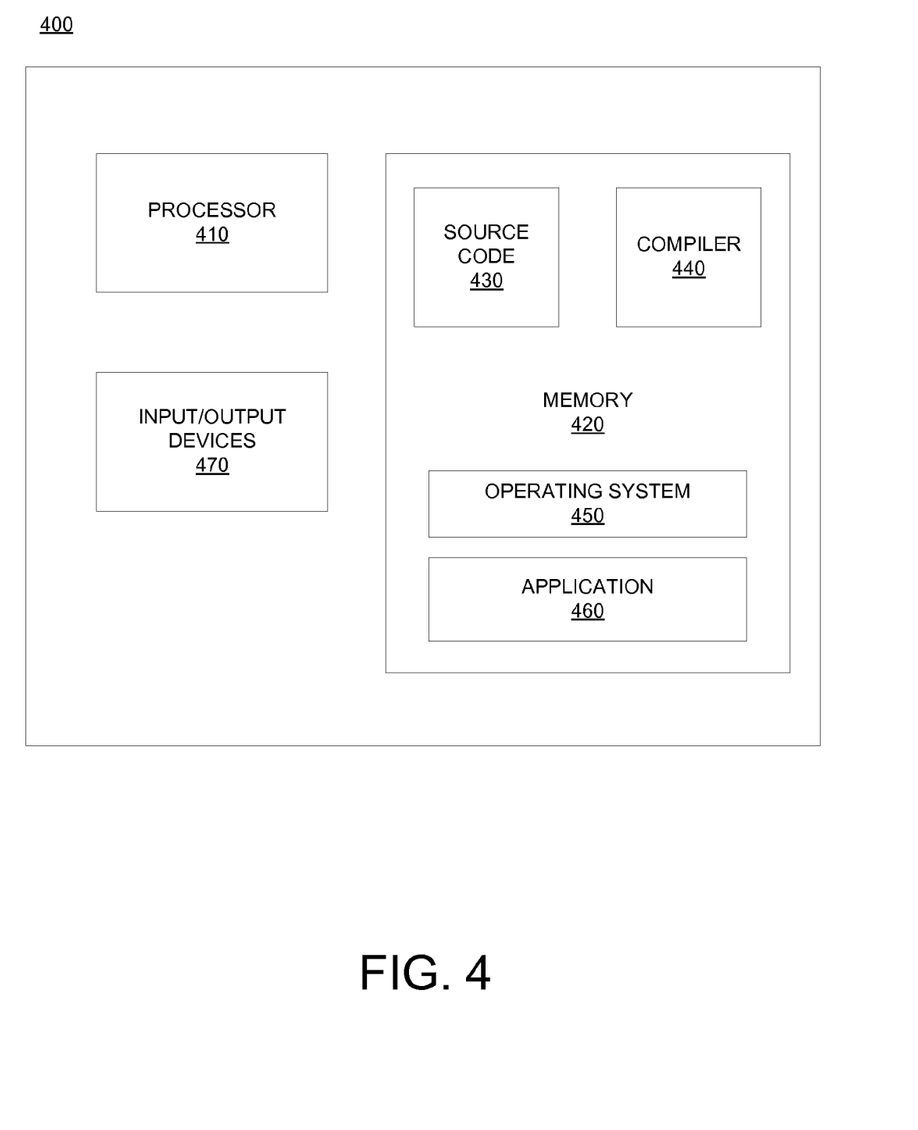
FIG. 4 illustrates an embodiment of a computer that may be used in conjunction with systems and methods for measurement tool fleet monitoring using fleet measurement precision/tool matching precision analysis.

FIG. 4 illustrates an example of a computer 400 which may be utilized by exemplary embodiments of systems and methods for measurement tool fleet monitoring using fleet measurement precision techniques as embodied in software. Various operations discussed above may utilize the capabilities of the computer 400. One or more of the capabilities of the computer 400 may be incorporated in any element, module, application, and/or component discussed herein, such as fleet monitoring system 101.

The computer 400 includes, but is not limited to, PCs, workstations, laptops, PDAs, palm devices, servers, storages, and the like. Generally, in terms of hardware architecture, the computer 400 may include one or more processors 410, memory 420, and one or more input and/or output (I/O) devices 470 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a digital signal processor (DSP), or an auxiliary processor among several processors associated with the computer 400, and the processor 410 may be a semiconductor based microprocessor (in the form of a microchip) or a macroprocessor.

The memory 420 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 420 may incorporate electronic, magnetic, optical, and/or other types of storage media. Note that the memory 420 can have a distributed architecture, where various components are situated remote from one another, but can be accessed by the processor 410.

The software in the memory 420 may include one or more separate programs, each of which comprises an ordered listing of executable instructions for implementing logical functions. The software in the memory 420 includes a suitable operating system (O/S) 450, compiler 440, source code 430, and one or more applications 460 in accordance with exemplary embodiments. As illustrated, the application 460 comprises numerous functional components for implementing the features and operations of the exemplary embodiments. The application 460 of the computer 400 may represent various applications, computational units, logic, functional units, processes, operations, virtual entities, and/or modules in accordance with exemplary embodiments, but the application 460 is not meant to be a limitation.

The operating system 450 controls the execution of other computer programs, and provides scheduling, input-output control, file and data management, memory management, and communication control and related services. It is contemplated by the inventors that the application 460 for implementing exemplary embodiments may be applicable on all commercially available operating systems.

Application 460 may be a source program, executable program (object code), script, or any other entity comprising a set of instructions to be performed. When a source program, then the program is usually translated via a compiler (such as the compiler 440), assembler, interpreter, or the like, which may or may not be included within the memory 420, so as to operate properly in connection with the O/S 450. Furthermore, the application 460 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 470 may include input devices such as, for example but not limited to, a mouse, keyboard, scanner, microphone, camera, etc. Furthermore, the I/O devices 470 may also include output devices, for example but not limited to a printer, display, etc. Finally, the I/O devices 470 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 470 also include components for communicating over various networks, such as the Internet or intranet.

If the computer 400 is a PC, workstation, intelligent device or the like, the software in the memory 420 may further include a basic input output system (BIOS) (omitted for simplicity). The BIOS is a set of essential software routines that initialize and test hardware at startup, start the O/S 450, and support the transfer of data among the hardware devices. The BIOS is stored in some type of read-only-memory, such as ROM, PROM, EPROM, EEPROM or the like, so that the BIOS can be executed when the computer 400 is activated.

When the computer 400 is in operation, the processor 410 is configured to execute software stored within the memory 420, to communicate data to and from the memory 420, and to generally control operations of the computer 400 pursuant to the software. The application 460 and the O/S 450 are read, in whole or in part, by the processor 410, perhaps buffered within the processor 410, and then executed.

When the application 460 is implemented in software it should be noted that the application 460 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 460 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 460 is implemented in hardware, the application 460 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include identification of poorly performing tools in a measurement tool fleet, allowing for proactive improvement of the measurement tool fleet.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for monitoring a fleet comprising a plurality of measurement tools, the method comprising:

collecting data for a current time interval from the fleet by a data collection module; and performing fleet measurement precision (FMP)/tool matching precision (TMP) analysis on the collected data by a FMP/TMP analysis module, wherein FMP/TMP analysis comprises:

determining a first TMP for each of the plurality of measurement tools using a dynamic benchmark measuring system (BMS), and determining a first FMP for the fleet using the dynamic BMS; and determining a second TMP for each of the plurality of measurement tools using a static BMS, and determining a second FMP for the fleet using the static BMS; and determining if the first FMP or the second FMP is above a predetermined threshold by a fleet improvement module, and in the event the first FMP or the second FMP is above the predetermined threshold:

identifying at least one tool of the plurality of tools as poorly performing based on the first and second TMPs; and flagging the identified at least one tool for improvement.

2. The method of claim 1, wherein collecting data regarding the fleet by the data collection module comprises statistical process control (SPC) data collection.

3. The method of claim 1, wherein the dynamic BMS and the static BMS are determined based on a subset of the plurality of measurement tools, or based on all of the plurality of measurement tools.

4. The method of claim 1, wherein the static BMS is determined based on fleet data from a past time interval in which the plurality of measurement tools were known to be stable or during which the plurality of measurement tools were known to be meeting predetermined measurement uncertainty requirements.

5. The method of claim 1, wherein the dynamic BMS is determined based on the collected data for the current time interval.

6. The method of claim 1, wherein the first and second TMP are determined based on a set of parameters, the set of parameters comprising slope-induced shift offset, precision, offset, and linearity; and wherein identifying at least one tool of the plurality of tools as poorly performing based on the first and second TMPs comprises identifying one or more significant parameters from the set of TMP parameters for the identified at least one tool, and wherein flagging the identified at least one tool for improvement comprises flagging the identified one or more significant parameters.

7. The method of claim 6, further comprising flagging a common significant TMP parameter across a plurality of identified tools.

8. The method of claim 1, further comprising performing statistical process control (SPC) analysis on the collected data in parallel with the FMP/TMP analysis by the fleet monitoring system.

9. The method of claim 1, wherein the plurality of measurement tools are part of a semiconductor manufacturing process.

10. A fleet monitoring system for monitoring a fleet comprising a plurality of measurement tools, the fleet monitoring system comprising:

a data collection module configured to collect data regarding the fleet;

a fleet measurement precision (FMP)/tool matching precision (TMP) analysis module configured to perform FMP/TMP analysis on the collected data, wherein FMP/TMP analysis comprises:

determining a first TMP for each of the plurality of measurement tools using a dynamic benchmark measuring system (BMS), and determining a first FMP for the fleet using the dynamic BMS;

determining a second TMP for each of the plurality of measurement tools using a static BMS, and determining a second FMP for the fleet using the static BMS; and a fleet improvement module configured to determine if the first FMP and the second FMP is above a predetermined threshold, and in the event the first FMP and the second FMP is above the predetermined threshold, identify at least one tool of the plurality of tools as poorly performing based on the first and second TMPs; and flag the identified at least one tool for improvement.

11. The fleet monitoring system of claim 10, wherein the data collection module is configured to collect data regarding the fleet using statistical process control (SPC) data collection.

12. The fleet monitoring system of claim 10, wherein the dynamic BMS and the static BMS are determined based on a subset of the plurality of measurement tools, or based on all of the plurality of measurement tools.

13. The fleet monitoring system of claim 10, wherein the static BMS is determined based on fleet data from a past time interval in which the plurality of measurement tools were known to be stable or during which the plurality of measurement tools were known to be meeting predetermined measurement uncertainty requirements.

14. The fleet monitoring system of claim 10, wherein the dynamic BMS is determined based on the collected data for the current time interval.

15. The fleet monitoring system of claim 10, wherein the first and second TMP are determined based on a set of parameters, the set of parameters comprising slope-induced shift offset, precision, offset, and linearity; and wherein the fleet improvement module is further configured to identify one or more significant parameters from the set of TMP parameters for the identified at least one tool, and flag the identified one or more significant parameters.

16. The fleet monitoring system of claim 15, wherein the fleet monitoring system is further configured to flag a common significant TMP parameter across a plurality of identified tools.

17. The fleet monitoring system of claim 10, wherein the fleet monitoring system is further configured to perform statistical process control (SPC) analysis on the collected data in parallel with the FMP/TMP analysis by the fleet monitoring system.

18. The fleet monitoring system of claim 10, wherein the plurality of measurement tools are part of a semiconductor manufacturing process.

19. A computer program product comprising a non-transitory computer readable storage medium containing computer code that, when executed by a computer, implements a method for monitoring a fleet comprising a plurality of measurement tools, wherein the method comprises:

collecting data for a current time interval from the fleet; and performing fleet measurement precision (FMP)/tool matching precision (TMP) analysis on the collected data, wherein FMP/TMP analysis comprises:

determining a first TMP for each of the plurality of measurement tools using a dynamic benchmark measuring system (BMS), and determining a first FMP for the fleet using the dynamic BMS;

determining a second TMP for each of the plurality of measurement tools using a static BMS, and determining a second FMP for the fleet using the static BMS;

determining if the first FMP and the second FMP is above a predetermined threshold, and in the event first FMP and the second FMP is above the predetermined threshold:

identifying at least one tool of the plurality of tools as poorly performing based on the first and second TMPs; and    flagging the identified at least one tool for improvement.

20. The computer program product according to claim 17, wherein the static BMS is determined based on fleet data from a past time interval in which the plurality of measurement tools were known to be stable or during which the plurality of measurement tools were known to be meeting predetermined measurement uncertainty requirements.

\* \* \* \* \*